No. 675,771. Patented June 4, 1901.
E. H. EISENHART.
AUTOMATIC WEIGHING MACHINE.
(Application filed Dec. 13, 1900.)
(No Model.) 5 Sheets—Sheet 1.

Witnesses
Robt Garrett
H B Keefer

Inventor
Edward H. Eisenhart
By James L. Norris
Atty

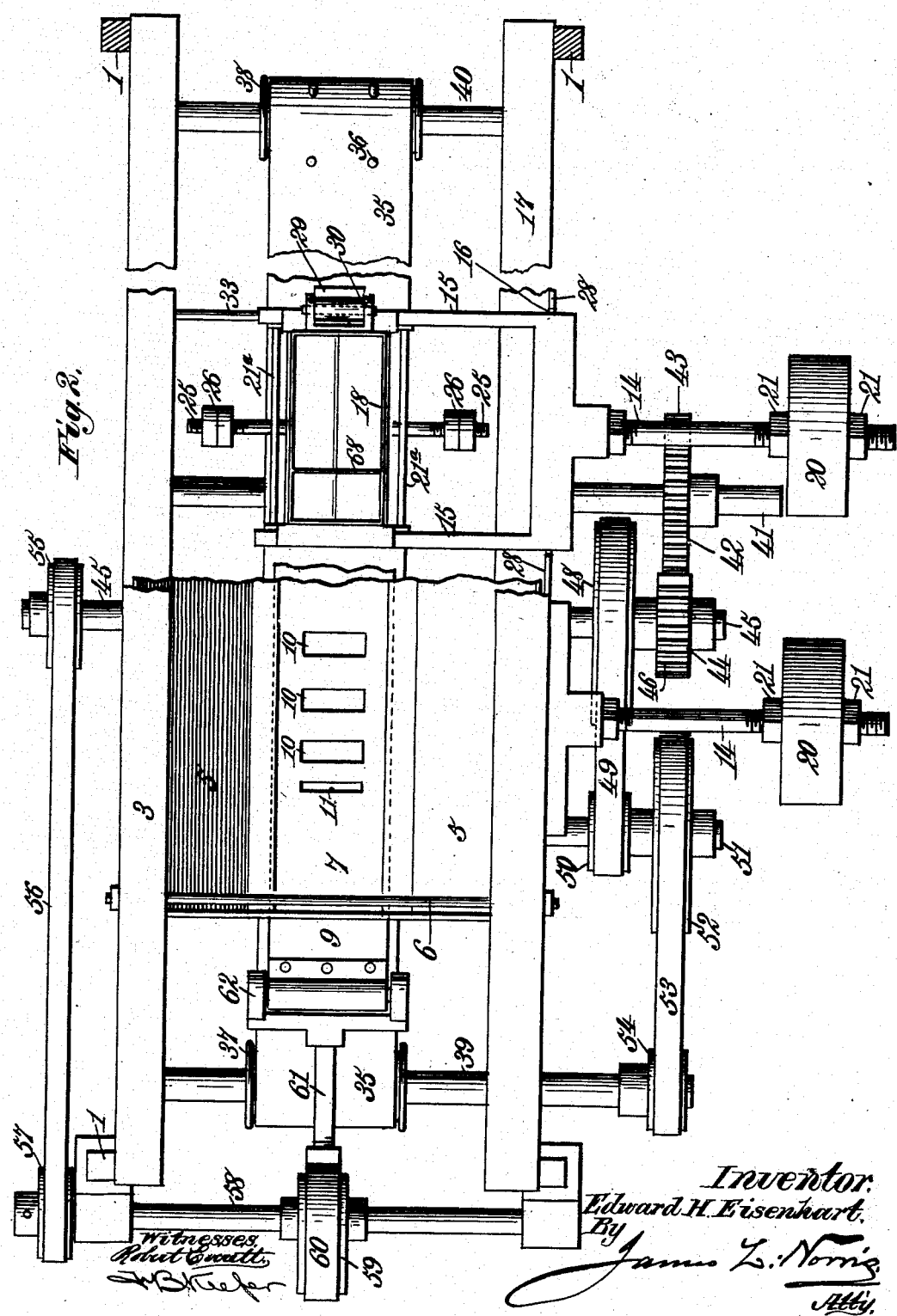

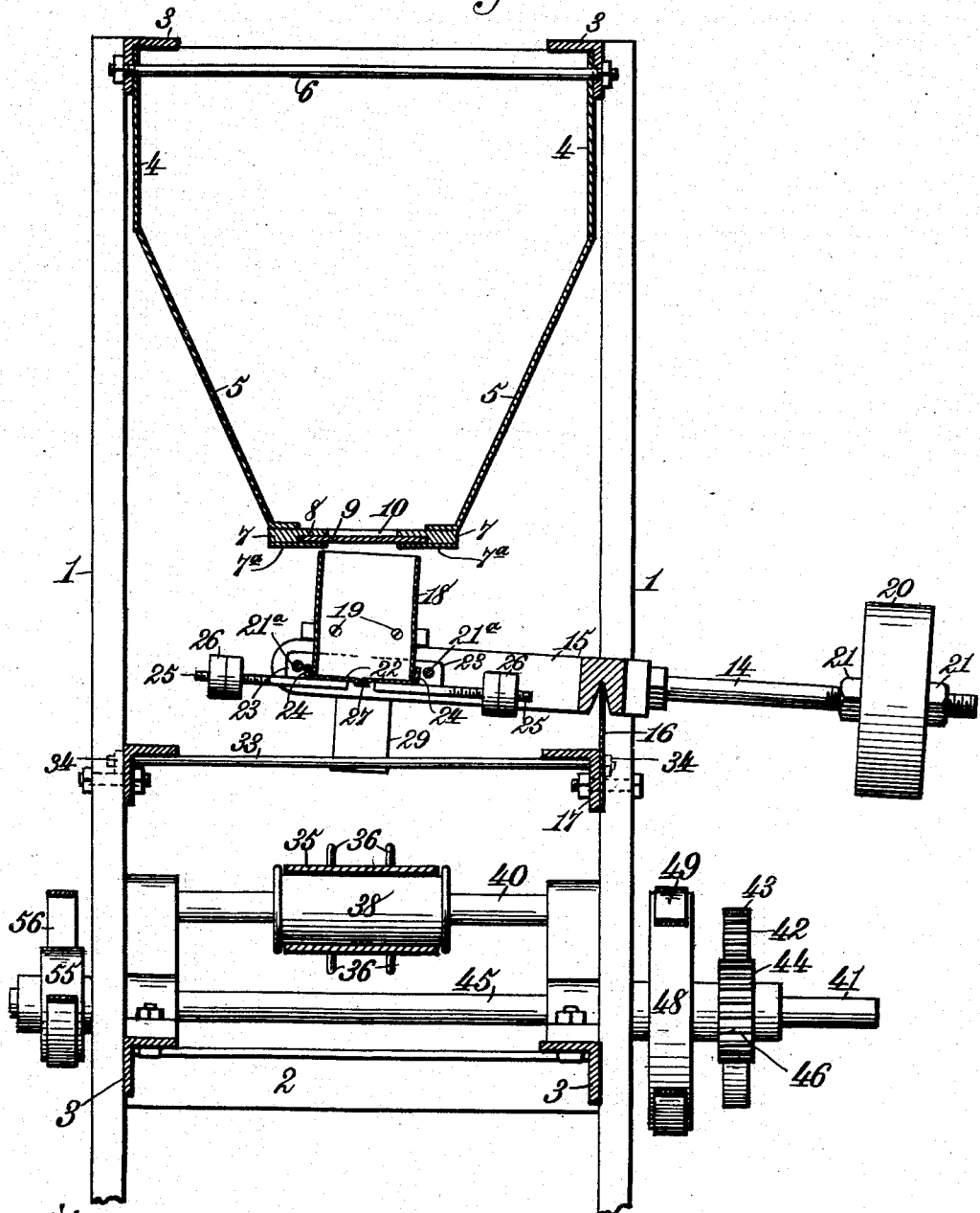

No. 675,771. Patented June 4, 1901.
E. H. EISENHART.
AUTOMATIC WEIGHING MACHINE.
(Application filed Dec. 13, 1900.)
(No Model.)  5 Sheets—Sheet 4.
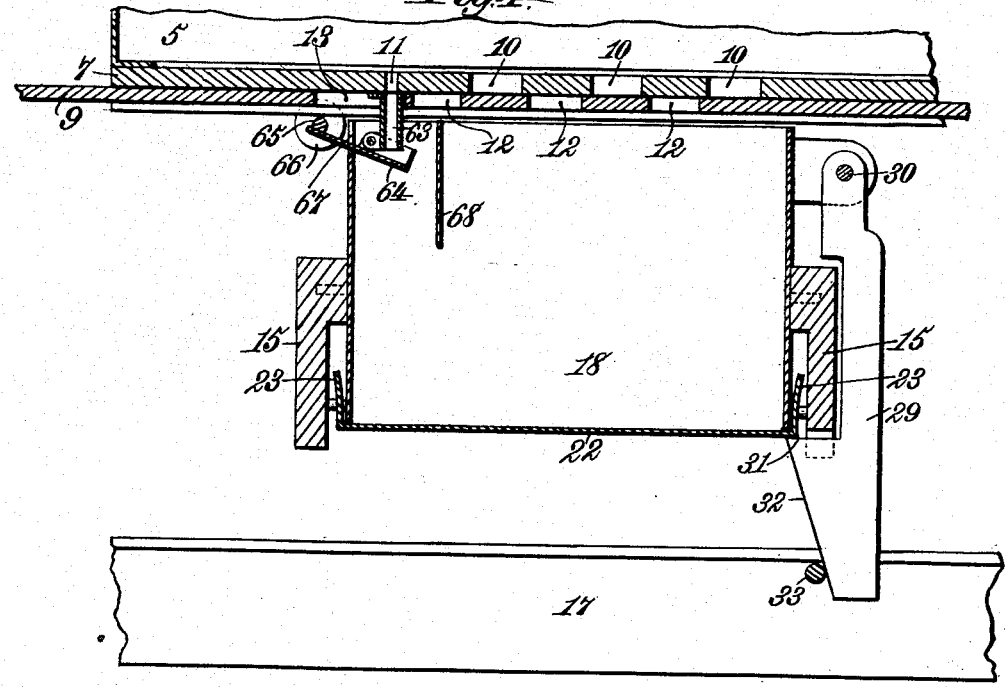
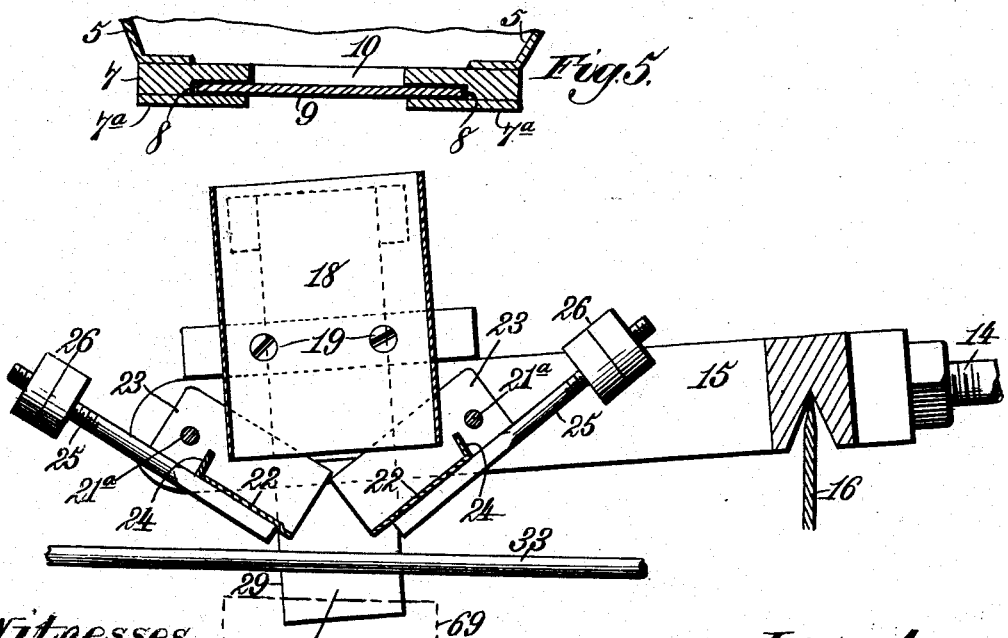
Witnesses
Inventor
Edward H. Eisenhart
By James L. Norris
Att'y No. 675,771. Patented June 4, 1901.
E. H. EISENHART.
AUTOMATIC WEIGHING MACHINE.
(Application filed Dec. 13, 1900.)
(No Model.) 5 Sheets—Sheet 5.

Witnesses.
Robert Everett.

Inventor:
Edward H. Eisenhart.
By James L. Norris
Atty.

UNITED STATES PATENT OFFICE.

EDWARD H. EISENHART, OF NEW YORK, N. Y.

AUTOMATIC WEIGHING-MACHINE.

SPECIFICATION forming part of Letters Patent No. 675,771, dated June 4, 1901.

Application filed December 13, 1900. Serial No. 39,761. (No model.)

*To all whom it may concern:*

Be it known that I, EDWARD H. EISENHART, a citizen of the United States, residing at New York, in the county of New York and State of New York, have invented new and useful Improvements in Automatic Weighing-Machines, of which the following is a specification.

This invention relates to automatic weighing-machines, and more especially to such machines employed for weighing sugar, coffee, spices, and similar commodities or articles of merchandise, and has for its object to provide a machine of the character referred to of novel and improved construction, wherein the material is fed directly from a hopper into the scale-pan and is discharged directly from the latter into the package-wrapper, box, or receptacle designed for its reception and in which it is to be put up for the market.

To this end my invention consists in the features and in the construction, combination, and arrangement of parts hereinafter fully described, and particularly pointed out in the claims following the description, reference being had to the accompanying drawings, forming a part of this specification, wherein—

Figure 1:
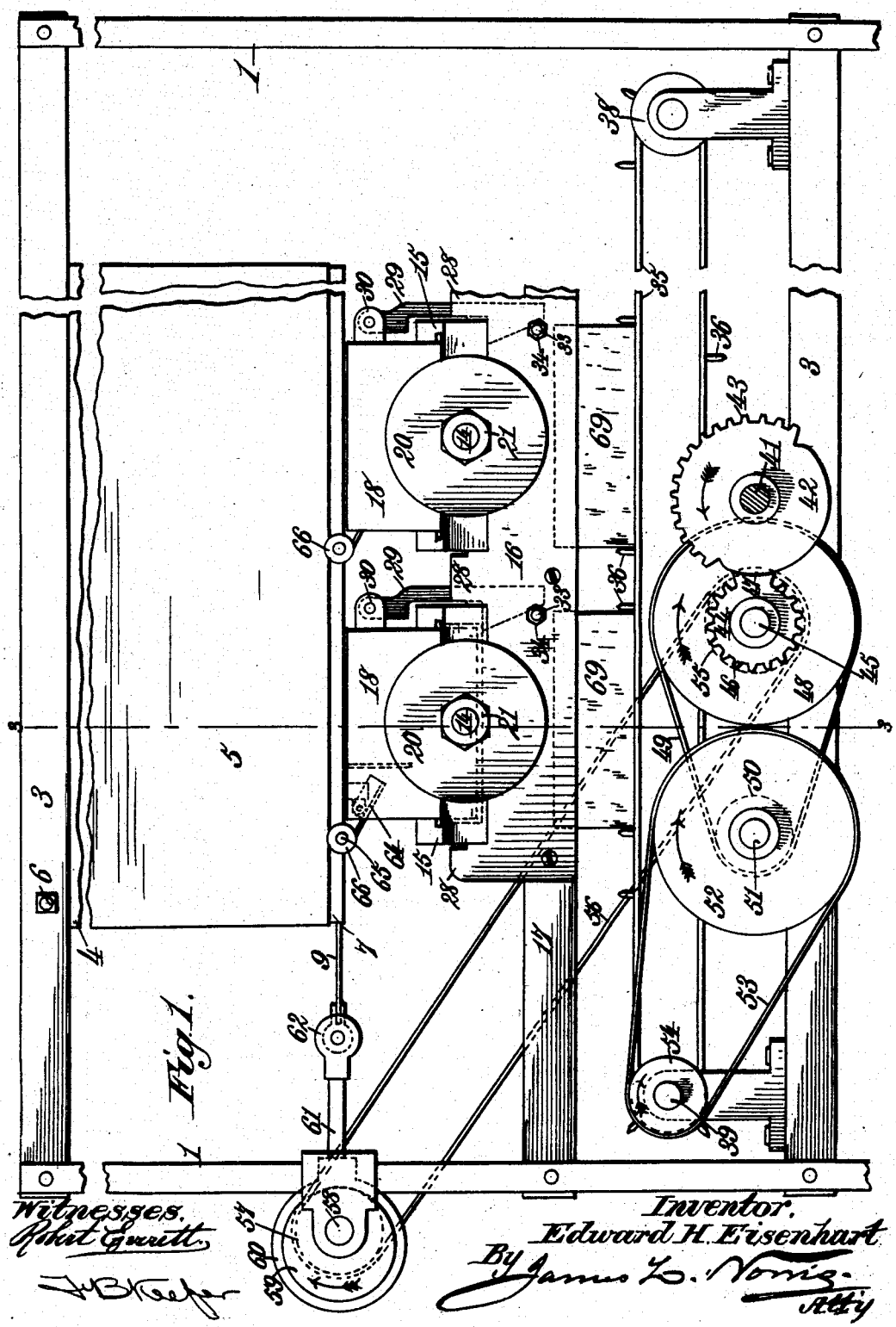
Figure 6:
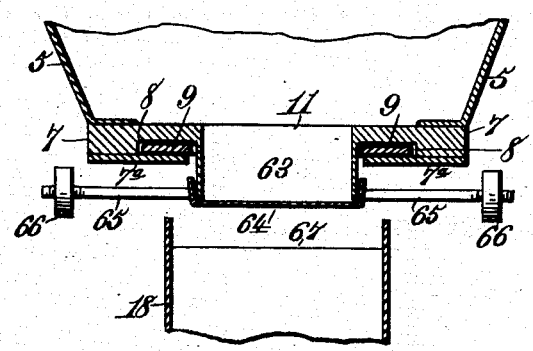
Figure 7:
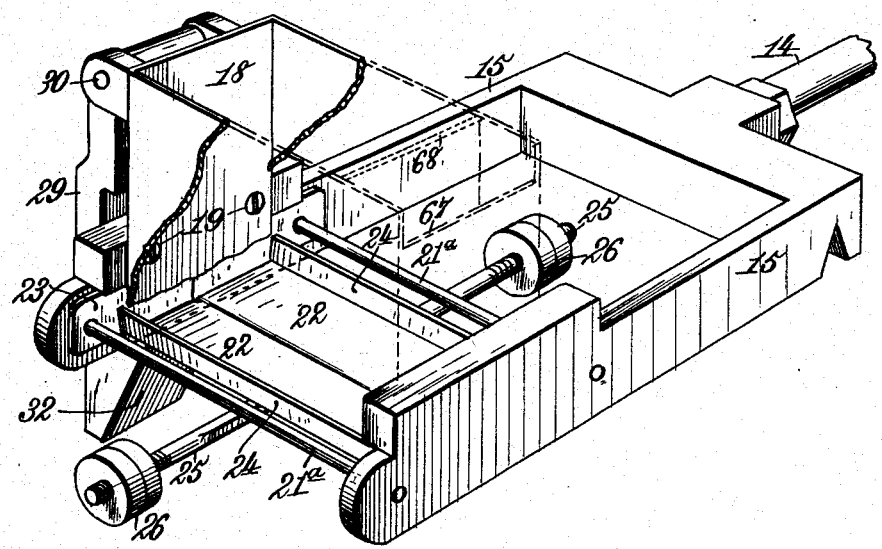
Figure 8:
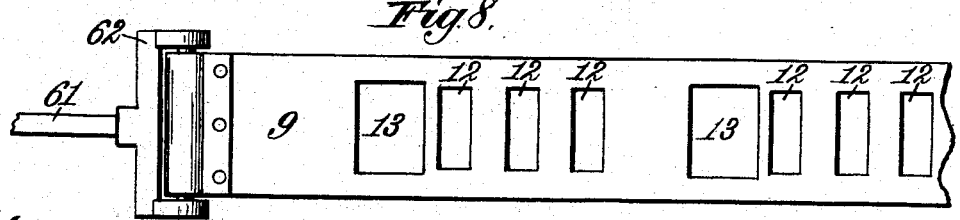

Figure 1 is a view in side elevation, illustrating a portion of the machine. Fig. 2 is a top plan view of a portion of the machine, a portion thereof being removed. Fig. 3 is a transverse vertical view taken on the line 3 3 of Fig. 1. Fig. 4 is a detail transverse sectional view of the scale-pan and feed cut-off, the scale-pan being shown in its elevated position. Fig. 5 is a similar view taken at a right angle to Fig. 4 and showing the scale-pan in its lowered position and in the act of discharging the weighed material. Fig. 6 is a detail view of the auxiliary or minor feed cut-off. Fig. 7 is a detail perspective view illustrating the swinging scale-beam, the scale-pan, and its gates or tilting bottoms; and Fig. 8 is a plan view of the reciprocating cut-off slide.

Referring to the drawings, the numerals 1 and 2, respectively, indicate the uprights and cross-beams of the frame of the machine, which may be constructed in any manner suitable for supporting the various parts. Suspended from two longitudinal stringers 3, bolted to the upper ends of the uprights 1 on opposite sides of the frame, is a hopper consisting of a trough having parallel upper sides 4 and inclined converging lower sides 5, the upper ends of the sides being rigidly attached to the stringers 3 by tie-rods 6, and the lower ends thereof are secured to the opposite sides of the bottom 7. The hopper extends the entire length of the machine and is common to a plurality of separate weighing devices, as will more fully hereinafter appear. The under side of the bottom 7 of the hopper is grooved or channeled out centrally and longitudinally, as at 8, (see Figs. 3, 5, and 6 of the drawings,) and arranged to freely move in said groove is a reciprocating slide 9, held in place by longitudinal strips $7^a$, attached to the bottom. The bottom 7 of the hopper is provided with several groups of feed-apertures, the groups corresponding in number to the number of weighing devices, and each group comprises a plurality of relatively large apertues or slots 10 and a small aperture or slot 11. The reciprocating slide is provided with a plurality of apertures corresponding to the apertures in the hopper-bottom, excepting that while the apertures 10 in the bottom are adapted to be brought into register with the apertures 12 of the slide the aperture 13 in said slide is sufficiently large to underlie or be placed in communication with the aperture 11 at all times. It will therefore be readily understood that when the slide is moved in one direction the apertures 10 and 12 will register with one another and the aperture 13 in the slide will register with the aperture 11 in the bottom of the hopper. It will therefore be understood that when the slide is moved in one direction all the apertures in both the slide and the bottom of the hopper will be caused to register, and when the slide is moved in the opposite direction the apertures 10 in the bottom of the hopper will be closed by the slide, while the auxiliary or minor feed-aperture 11 will remain open. Hence it follows that when the slide is moved in one direction all the apertures in both the bottom of the hopper and the slide are open and the material is fed therethrough, while when the slide is moved in the opposite direction all the apertures 10 are closed and the aperture 11 remains open. The larger openings 10 I denominate the "major feed" and the smaller opening 11 the "minor feed," and means are provided for opening and closing the minor feed-opening at proper intervals, as will hereinafter be described.

Beneath each group of apertures 10 and 11 is arranged a weighing device, constructed as follows: The numeral 14 indicates a scale-beam forked at one end, as at 15, and provided on its under side with a V-shaped notch or recess that straddles a knife-edge 16. The knife consists of a steel plate beveled or sharpened at its upper edge and bolted or otherwise suitably fastened to a beam 17, which in turn is bolted to the uprights 1 of the frame of the machine. In the forked end of each of the scale-beams is secured a scale-pan consisting of a rectangular box or casing 18, open at its upper end and at its lower end disposed between the forked ends 15 of the scale-beam and secured to the latter by screws 19 or other suitable fastening devices. On the outer end of the scale-beam is arranged a weight 20, that may be adjusted longitudinally on the scale-beam and is held in its adjusted position by means of nuts 21, screwed on the scale-beam on opposite sides of the weight. In practice the weight will be adjusted on the scale-beam to such a position that it will hold the scale-pan elevated until the latter has had deposited therein a quantity of material that will be of the desired weight, and thereupon the scale-pan will be depressed and will dump or discharge its contents in the manner and by the means which will now be described. Passing through the forked ends of each of the scale-beams are two tie-rods 21ª, said rods being disposed on opposite sides of the scale-pan 18, and pivoted on each of said rods is a gate, preferably formed of sheet metal and comprising a bottom 22, sides 23, and an outer or rear end 24, that is formed by bending up the bottom at a right angle, as is most clearly shown in Fig. 5 of the drawings. Attached centrally to the under side of each of the gates 22 is a rod 25, on the outer or free end of which is adjustably mounted a weight 26. One of each pair of gates is provided with a lip or offset flange 27, that is adapted to lap under the edge of the adjacent gate to form a tight closure between the two and prevent leakage of the material from the scale-pan, and the weight 26 of the other gate is adjusted slightly farther from its fulcrum, so that said gate will be caused to rise slightly quicker than and in advance of its companion. When the gates are closed or in their elevated position, the sides 23 and rear ends 24 embrace the sides and ends of the lower end of the scale-pan and prevent leakage of the contents therefrom. As shown most clearly in Fig. 1, the knife-edge 16 extends approximately the entire length of the machine and forms a fulcrum for all the scale-beams, and said knife-edge is formed with upwardly-projecting flanges or shoulders 28, that intervene between the scale-beams and prevent lateral displacement of the latter. When the scale-pans are empty, the weights 26 operate to hold the gates closed, and said gates of each scale-pan are held closed to sustain the weight of the contents of the scale-pan by a latch 29, which is pivoted at its upper end to the side of the scale-pan, as at 30, and at its lower end is provided with a shoulder 31, which is adapted to hook under the gates and hold the latter closed. The extremity of the latch 29 is beveled, as at 32, and said beveled end lies against a rod 33, that is arranged transversely of the frame of the machine and is secured thereto by nuts 34. The relative arrangement of the latches 29 and rods 33 is such that when the scale-pans are elevated the latches are caused to engage the under side of the gates by gravity and hold the latter closed; but when the scale-pans swing down under the influence of the weight of their contents the beveled ends 31 of the latches are thrust laterally to one side by their engagement with the rods 33, and the shoulders 31 disengage the gates and release the latter, and said gates are thereupon tilted downward by the material in the scale-pans and dump or discharge the same, as shown in Fig. 5.

Arranged to travel beneath all the scale-pans is an endless carrier 35, having affixed thereto at suitable intervals fingers 36, which project at right angles to the apron or carrier and are adapted to engage the ends of the boxes, trays, or receptacles into which the weighed material is to be deposited. The apron or endless carrier 35 travels around two pulleys 37 and 38, respectively mounted on shafts 39 and 40, and one of said pulleys, as 37, is driven from the power-shaft of the machine, as will be presently made apparent. The numeral 41 indicates the main or power shaft of the machine, which is driven from any suitable source of power, and on said shaft is mounted a wheel 42, one portion of the periphery of which is provided with gear-teeth 43 and the other part is smooth. The wheel 42 is arranged to engage a wheel 44, fixed on a transverse shaft 45, and said wheel 44 is provided on the major portion of its periphery with gear-teeth 46, while its remaining portion is made smooth and concave, as at 47. On the shaft 45 is fixed a pulley 48, which is connected by a belt 49 to a pulley 50, fixed on a shaft 51, and on the shaft 51 is fixed a pulley 52, which is connected by a belt 53 to a pulley 54, fixed on the shaft 39, before referred to. On the shaft 45 is fixed a pulley 55, which is connected by a belt 56 to a pulley 57, mounted on a shaft 58, journaled in suitable bearings at one end of the frame of the machine, and on the shaft 58 is fixed a cam or eccentric 59, which is arranged to rotate within a collar 60. The collar 60 is fixed on a pitman or connecting rod 61, and on the end of said rod is fixed a yoke 62, to which is pivotally connected one end of the cut-off slide 9. As before stated, the aperture 13 in the cut-off slide is of such size that the aperture or slot 11 in the bottom of the feed-hopper will always register therewith, and hence the apertures 11 and 13 will always be in position to permit the material to pass therethrough from the hopper to the scale-pans. To the under side of the bottom 7 of the hopper, directly beneath the aperture 11, is fastened a feed-spout 63, and to the sides of said spout is pivoted a cut-off gate 64, to the outer end of which is fastened a transverse rod 65, and on the ends of said rod are mounted weights 66. One edge of the scale-pan is cut away, as at 67, in such a manner that when the scale-pan is elevated its edge will engage the outer end of the gate 64 and hold the latter open; but when the scale-pan descends beneath the weight of its contents the gate 64 will be raised by the weights 66 and will close the lower end of the spout 63. Each scale-pan is provided with a transverse vertical partition 68 near one end, which extends from the upper edge of the scale-pan to a point approximately midway between the top and bottom thereof, said partition operating to divide the scale-pan into two chambers, one of which is fed by the major feed-openings 10 and the other by the minor feed-aperture 11. It will be understood that each machine will comprise a plurality of scale-pans, the feed-hopper being common to all the scale-pans and all the latter operating to discharge their contents into boxes, trays, or receptacles 69, carried by the apron 35 and in which the weighed material is placed upon the market.

The operation of my improved weighing-machine is as follows: In the present instance it will be assumed that the machine is provided with nine separate scale-pans, though any other number may be manifestly employed. The shaft 41 being rotated as long as the smooth portion of the wheel 42 is in engagement with the concave portion 47 of the wheel 44, as shown in Fig. 1, which will be for one part of a revolution of the wheel 42, the wheel 44 will be idle. Hence both the slide 9 and the endless carrier 35 will remain at rest, or motionless, the major feed-openings 10 being at such time closed. As soon, however, as the teeth of the wheel 42 engage the teeth of the wheel 44 the latter is put in rotation and forms one complete revolution while the wheel 42 is making one part of a revolution or while the teeth of the latter are in gear with the teeth of the wheel 44. During the first half-revolution of the wheel 44 the cam 59 will be opening the major feed-openings 10 and material will be fed from the hopper through said major feed-openings and the minor feed-openings, and the endless carrier 35 will be operating to move to one side the boxes or receptacles 69, which had been previously filled. During this time, all the feed-apertures being open, the scale-pans will receive the major portion of the material which they are set to receive. During the final half-revolution of the wheel 44 the cam will operate to close the major feed-openings 10; but the minor feed-openings will remain open, owing to the scale-pans bearing against the gates 64 and holding the latter away from the spouts 63, and hence small quantities of the material will continue to be fed into the scale-pans through the minor feed-apertures. During this time the endless carrier will continue to travel, carrying away the filled boxes or receptacles and bringing forward empty ones in their place, and by the time the smooth portion of the wheel 42 engages the smooth concave portion 47 of the wheel 44 all the filled receptacles will have been moved away and all the empty ones will have been moved into place beneath the scale-pans, where they will remain stationary until the teeth of the wheels 42 and 44 again gear with each other. While the smooth portions of the wheels 42 and 44 are in engagement, and hence while the carrier and cam are idle, the minor feed-openings continue to feed in the material in small streams to the scale-pans until the predetermined weight of the material has been fed to the scale-pans, whereupon the latter overbalance the weights 20 and the scale-pans drop to the position shown in Fig. 5. As the scale-pans swing down to their lowered positions the rods 33, being in engagement with the beveled partitions 32 of the latches, thrust the latter to one side, thereby releasing the gates 22, which are then tilted or swung down by the weight of the contents of the scale-pans and dump or discharge said contents into the boxes or receptacles 69. As soon as the scale-pans have discharged their contents the weights 20 again elevate said pans and the weights 26 close the gates 22. When the scale-pans are lowered, they disengage the gates 64, and the weights 66 immediately close said gates against the lower ends of the spouts 63, cutting off the minor feed-openings, and as the scale-pans are again elevated they engage said gates 64 and open the feed-spouts 63. When the teeth of the wheels 42 and 44 again engage one another, the operation is repeated.

In the example assumed—that is to say, a machine employing nine scale-pans—the gearing is so relatively constructed that the pulley 48 makes a complete revolution while the wheel 42 is making a partial revolution, the pulley 52 makes three revolutions while the pulley 48 makes one, and the pulley 37 makes three revolutions while the pulley 52 makes one, or, in other words, the pulley 37 makes nine revolutions while the shaft 45 is making one. Hence the carrier 35 will move all the nine filled receptacles 69 from beneath the scale-pans and will move thereunder a corresponding number of empty ones during the time the toothed portions of the wheels 42 and 44 are in gear. By providing the partitions 68 the material fed into the scale-pans through the major feed-openings will be prevented from flowing under the gates 64 and interfering with the operation of the latter.

I have shown the scales or weighing devices arranged side by side or in a straight row; but it will be manifest that they may be otherwise arranged, provided the arrangement is continuous.

Having described my invention, what I claim is—

1. In a weighing-machine, the combination with a plurality of counterbalanced scale-pans, of a hopper common to all of said scale-pans and provided with a plurality of groups of feed-apertures, said groups of feed-apertures corresponding in number to the number of scale-pans and each group comprising a series of major feed-apertures and a single minor feed-aperture, and means for alternately opening and closing all the major feed-openings simultaneously, substantially as described.

2. In a weighing-machine, the combination with a plurality of counterbalanced scale-pans, of a hopper common to all of said scale-pans and provided with a plurality of groups of feed-apertures, said groups of feed-apertures corresponding in number to the number of scale-pans and each group comprising a series of major feed-apertures and a single minor feed-aperture, a slide provided with apertures adapted to be thrown into and out of register with the major feed-apertures one of said apertures of each group in the slide being arranged to register at all times with the minor feed-aperture in the corresponding group of apertures in the hopper, and means for intermittingly reciprocating said slide at regular-timed intervals, substantially as described.

3. In a weighing-machine, the combination with a plurality of counterbalanced scale-pans, of a hopper common to all the scale-pans and provided with a plurality of groups of feed-apertures, said groups of feed-apertures corresponding in number to the number of scale-pans, and each group comprising a plurality of major feed-apertures and a single minor feed-aperture, means for alternately opening and closing all the major feed-apertures simultaneously, a spout pendent from each minor feed-aperture and extending into the corresponding scale-pan, and means for automatically closing said spouts when the scale-pans are depressed, substantially as described.

4. In a weighing-machine, the combination with a plurality of counterbalanced scale-pans, of a hopper common to all the scale-pans and provided with a plurality of groups of feed-apertures, said groups corresponding in number to the number of scale-pans and each group comprising a plurality of major feed-apertures and a single minor feed-aperture, means for alternately opening and closing all the major feed-apertures simultaneously, a spout pendent from each minor feed-aperture and extending into the corresponding scale-pan, a hinged gate for each spout, and weights for normally holding said gates closed against the discharge ends of the spouts, the arrangement being such that when the scale-pans are elevated they engage said gates and hold them open, substantially as described.

5. In a weighing-machine, the combination with a counterbalanced scale-pan, of a hopper arranged above the scale-pan and provided with a plurality of major feed-apertures and a single minor feed-aperture, all arranged to discharge material from the hopper into the scale-pan; means for alternately opening and closing the major feed-apertures at timed intervals, and for automatically preventing the discharge of material from the minor feed-aperture when the scale-pan is depressed, and a transverse vertical partition in the scale-pan between the major and minor feed-apertures, substantially as described.

6. In a weighing-machine, the combination with a counterbalanced scale-pan, of a hopper arranged above the scale-pan and provided with a plurality of major feed-apertures and a single minor feed-aperture, all arranged to discharge material from the hopper into the scale-pan, means for alternately opening and closing the major feed-apertures at timed intervals and for automatically preventing the discharge of material from the minor feed-aperture when the scale-pan is depressed, and a transverse vertical partition in the scale-pan between the major and minor feed-apertures, said partition terminating at its lower edge at a point above the bottom of the scale-pan, substantially as described.

7. In a weighing-machine, the combination with a counterbalanced scale-pan, of a hopper arranged above the scale-pan and provided with a plurality of major feed-apertures and a single minor feed-aperture, all arranged to discharge material from the hopper into the scale-pan, means for alternately opening and closing the major feed-apertures at timed intervals, a spout pendent from the minor feed-aperture and projecting at its lower end into the scale-pan, a hinged gate weighted to normally close the lower end of said spout, and a vertical partition disposed in the scale-pan between said spout and the major feed-apertures, the arrangement being such that when the scale-pan is elevated it will engage and hold open said gate, substantially as described.

8. In a weighing-machine, the combination with a counterbalanced scale-pan provided with two gates or tilting bottoms weighted to normally close the bottom of the scale-pan, one of said gates being provided with a lip or flange adapted to lap under the adjacent edge of the other gate when the gates are closed, said other gate being more heavily weighted than its companion, means for holding the gates closed and means for automatically releasing said gates on the descent of the scale-pan, substantially as described.

9. In a weighing-machine, the combination with a counterbalanced scale-pan provided with two gates or tilting bottoms, one of said gates being arranged to underlap the adjacent edge of the other gate, and the said overlapping gate being more heavily weighted than its companion to cause it to close in advance of said companion gate, of a pivoted latch carried by said scale-pan and provided with a shoulder arranged to engage the under side of said underlapping gate and hold both gates closed, said latch being provided with a beveled lower end, and a fixed rod arranged in the path of movement of the latch and operating to engage said beveled end and thrust the latch to one side to release the gates on the descent of the scale-pan, substantially as described.

10. In a weighing-machine, the combination with a plurality of counterbalanced scale-pans and a feed-hopper common to all said scale-pans, of a feed cut-off arranged to control the feed from the hopper to the scale-pans, a carrier arranged to deliver receptacles beneath the scale-pans and remove them therefrom, and mechanism constructed to periodically actuate the cut-off to feed the material from the hopper to the scale-pans and simultaneously actuate the said carrier to feed forward the receptacles, substantially as described.

11. In a weighing-machine, the combination with a plurality of counterbalanced scale-pans and a feed-hopper common to all said scale-pans, of a feed cut-off arranged to control the feed from the hopper to the scale-pans, a carrier arranged to deliver receptacles beneath the scale-pans and remove them therefrom, a power-shaft, a cam and connected mechanism actuated by said power-shaft for operating the cut-off, and gearing operated from said power-shaft for feeding forward the carrier simultaneously with the movement of the cut-off, substantially as described.

12. In a weighing-machine, the combination with a plurality of counterbalanced scale-pans and a feed-hopper common to all said scale-pans, of a feed cut-off arranged to control the feed from the hopper to the scale-pans, a carrier arranged to deliver receptacles beneath the scale-pans and remove them therefrom, a power-shaft, a cam and connected mechanism actuated by said power-shaft for operating the cut-off, and multiplying-gearing actuated by the power-shaft for feeding forward the carrier, said power-shaft being arranged to automatically throw into and out of engagement the said cam and carrier, substantially as described.

13. In a weighing-machine, the combination with a hopper, of a scale-pan provided with a partition near one end dividing said pan into a major and a minor part, both said parts receiving their supplies from the hopper and both said parts of the pan being arranged to simultaneously dump their contents directly into a package-wrapper, means for first feeding material from the hopper simultaneously to both the major and minor parts of the pan, means for cutting off the feed from the major part of the pan while the material continues to be fed to the minor part thereof, and means for finally cutting off the feed from the minor part of the pan when the latter has received a predetermined quantity, substantially as described.

14. In a weighing-machine, the combination with a hopper, of a counterbalanced scale-pan provided with a partition dividing the scale-pan into a major and a minor part, said hopper being provided with a feed-aperture arranged to feed material to the minor part of the scale-pan, means for feeding material from the hopper simultaneously to both the major and minor parts of the pan, means for cutting off the feed from the major part of the pan while the material continues to be fed to the minor part thereof, and a gate for controlling the said minor feed-aperture, said gate comprising a pivoted plate weighted at one end to normally hold it elevated to close said feed-aperture, the arrangement being such that when the scale-pan is elevated it holds said gate open and when the scale-pan descends the weighted gate automatically closes, substantially as described.

In testimony whereof I have hereunto set my hand in presence of two subscribing witnesses.

EDWARD H. EISENHART.

Witnesses:
 JAMES L. NORRIS,
 PHILIP N. TILDEN.